US006868974B2

(12) United States Patent
Hoffmann (10) Patent No.: US 6,868,974 B2
(45) Date of Patent: Mar. 22, 2005

(54) SEDIMENTATION FILTRATION INSTALLATION

(76) Inventor: Klaus Hoffmann, Femdorfstr. 5, 57250 Netphen (DE)

(*) Notice: Subject to any disclaimer, the term of this patent is extended or adjusted under 35 U.S.C. 154(b) by 0 days.

(21) Appl. No.: 10/249,010

(22) Filed: Mar. 10, 2003

(65) Prior Publication Data

US 2003/0116500 A1 Jun. 26, 2003

Related U.S. Application Data

(63) Continuation of application No. PCT/DE01/03486, filed on Sep. 11, 2001, now abandoned.

(30) Foreign Application Priority Data

Sep. 11, 2000 (DE) .............................. 10044817

(51) Int. Cl.$^7$ ............................................... B01D 21/04
(52) U.S. Cl. ...................... 210/519; 210/521; 210/525; 210/526; 210/540
(58) Field of Search ................................. 210/519, 521, 210/522, 525, 526, 538, 540, 532.1

(56) References Cited

U.S. PATENT DOCUMENTS

| 1,493,861 A | * | 5/1924 | Kusch ........................ 210/519 |
| 2,254,176 A | | 8/1941 | Fischer |
| 2,573,615 A | * | 10/1951 | Jean ........................... 210/521 |
| 2,973,866 A | | 3/1961 | Genter et al. ............... 210/519 |
| 3,194,399 A | | 7/1965 | Harms |
| 3,529,728 A | * | 9/1970 | Jonge ......................... 210/522 |
| 3,903,000 A | * | 9/1975 | Miura et al. ................ 210/521 |
| 4,123,365 A | * | 10/1978 | Middelbeek ................ 210/521 |
| 4,238,333 A | | 12/1980 | Tidewell ..................... 210/800 |
| 4,351,733 A | * | 9/1982 | Salzer et al. ............... 210/521 |
| 4,514,303 A | * | 4/1985 | Moore ........................ 210/521 |
| 4,645,598 A | | 2/1987 | Hannum ..................... 210/232 |
| 4,701,260 A | * | 10/1987 | Lee ............................ 210/526 |
| 4,957,628 A | * | 9/1990 | Schulz ....................... 210/519 |
| 5,378,378 A | | 1/1995 | Meurer ....................... 210/788 |
| 5,536,409 A | | 7/1996 | Dunkers ..................... 210/519 |
| 5,601,704 A | | 2/1997 | Salem et al. ................. 210/86 |
| 5,605,636 A | * | 2/1997 | Wyness ....................... 210/519 |
| 5,700,378 A | * | 12/1997 | Lee et al. ................... 210/521 |
| 6,517,715 B1 | * | 2/2003 | Batten et al. ............... 210/540 |

FOREIGN PATENT DOCUMENTS

| FR | 2124494 | 9/1972 |
| GB | 925993 | 5/1983 |

* cited by examiner

Primary Examiner—Christopher Upton
(74) Attorney, Agent, or Firm—Gudrun E. Huckett (57) ABSTRACT

For increasing the capacity of a continuously operating sedimentation filtration device, the processing liquid to be cleaned is supplied before or adjacent to the filter body on opposed sides into the sedimentation container. Underneath the filter body, a comparatively high settling chamber is formed and between the filter body and the supply lines a separating plate is provided so that the processing liquid to be cleaned is guided mandatorily into the settling chamber. The cross-sections of the supply lines provided on opposed said are comparatively large so that only minimal flow velocities of the incoming medium will occur.

21 Claims, 8 Drawing Sheets

SEDIMENTATION FILTRATION INSTALLATION

CROSS REFERENCE TO RELATED APPLICATIONS

This is a continuation of International Application PCT/DE01/03486 with an international filing date of Sep. 11, 2001, not published in English under PCT Article 21(2), and now abandoned.

BACKGROUND OF INVENTION

The invention relates to a continuously operating sedimentation filtration installation for cleaning contaminated processing liquids such cooling agents; hydroforming water; drilling, rolling, grinding, and turning emulsions; rinsing water; and the like. The installation is comprised of a sedimentation container with a plurality of plate-shaped filter elements arranged at a slant and extending parallel to one another at a spacing to one another. The filter elements together form a filter body. The installation further comprises a removal device for the deposited sediment, a supply opening into the sedimentation container for introducing contaminated processing liquid, and a clean liquid tank connected to an overflow of the sedimentation container and configured for receiving the filtered processing liquid.

Sedimentation filtration devices are used for cleaning processing liquids which are contaminated during a production or machining process by particles whose relative density is greater than that of the actual processing liquid. These particles settle in a container as a result of the gravity acting on them and form a so-called sediment which must be removed from the sedimentation container by means of suitable devices.

In order to increase the settling speed of the particles and thus the throughput of such a device, plate-shaped filter elements are arranged according to the prior art in the interior of the sedimentation container and are positioned at a slant and spaced from one another by means of spacer elements.

By means of the described arrangement of the filter elements, the deposition path of the individual particles is drastically reduced; in the known devices, it is presently approximately 5 to 15 mm.

As a result of shortening the deposition path, the dirt particles to be removed practically do not disturb one another during deposition so that the cleaning effect and capacity of such devices is increased in comparison to simple settling containers.

The sediment deposited on the filter elements is removed by means of blowpipes arranged underneath the filter body, wherein, in the case of large size installation, the filter elements are brought into a vertical position by suitable adjusting devices for the task of blowing off the sediment.

The thick particle cake then sinks from the filter elements onto the bottom of the settling container from where it is removed by scraper belts or similar removal devices.

In the known devices, the processing liquid to be cleaned is supplied by means of a supply pipeline adjacent to the filter body such that the processing liquid flows mainly laterally into the filter body.

In order to prevent that air bubbles, which would disturb the settling process, are introduced with the processing liquid into the sedimentation container, the supply lines have sufficiently sized venting lines. Since during cleaning of the filter elements by means of compressed air it is advantageous to have a low liquid level, this level can be adjusted by means of pumps.

The cleaned processing liquid passes through an overflow in the sedimentation container into a clean liquid tank from where it can be returned into the corresponding machining or production process.

In addition to removal of dirt particles of higher relative density from the processing liquid, there often occurs a contamination of processing liquid with so-called foreign oil, in particular, in metal processing, wherein the foreign oil has a smaller relative density in comparison to the processing liquid and, as a result of this, will float to the surface of the liquid in the sedimentation container. At the surface, it can be skimmed off by corresponding weirs and removal devices, wherein the overflow from the sedimentation container to the clean liquid tank is arranged closely underneath the upper liquid level.

In the known sedimentation filtration devices of the afore described configuration and function type, the processing liquid to be cleaned is supplied via a pipeline having a comparatively minimal flow cross-section and opening laterally adjacent to or before the filter body. The free space which is formed underneath the filter body is relatively low in the devices of the prior art because it is desired to have a minimal height of the entire installation.

The described filtration devices however have a minimal throughput and are prone to disturbances when an increased dirt loading of the processing liquid is present.

SUMMARY OF INVENTION

It is therefore an object of the invention to provide a reliably operating sedimentation filtration device with increased throughput.

This object is solved according to the invention in that, for supplying the processing liquid into the sedimentation container, at least two connecting sockets are provided on opposite sides of the container that open adjacently to or in front of the filter elements; in that a settling chamber filled with liquid is provided between the bottom side of the filter body and the bottom of the sedimentation container whose vertical height is at least one fifth of the vertical height of the filter body; and in that a flow conducting plate is provided between the filter body and the connecting sockets which mandatorily guides the supplied processing liquid into the settling chamber.

By means of these measures according to the invention, the flow velocity of the medium flowing into the settling container, for identical pipeline diameter, is already cut at least in half, wherein this effect can be increased even more by enlarged pipe cross-sections. At the same time, the flow direction in front of the settling chamber is reversed so that only locally limited flow swirls will occur which only minimally reduce the settling velocity of the dirt particles. Moreover, with this measure it is prevented that already deposited sediment is again whirled up into the area of the filter body. The flow conducting plate provided between the filter body and the connecting sockets separates the incoming processing liquid initially from the filter body and guides it into the settling chamber underneath the filter elements from where the processing liquid flows from the bottom to the top through the filter body. As a result of the reduction of the flow velocity, greater dirt particles have already settled beforehand. Also, increasing the height of the settling chamber contributes to a calming effect on the turbulent flow so that less sediment is whirled up.

The connecting sockets opening laterally adjacent to or before the filter body can be widened in a box shape for achieving an additional reduction of the inflow velocity, wherein the connecting sockets extend preferably at a slant into the settling chamber in order to avoid pre-sedimentation within the connecting sockets. Because of the slanted position of the connecting sockets, the sediment which is settling thereon slides into the settling container and can be removed from it by means of the aforementioned scraper belt. This measure is important, in particular, for a high dirt loading of the processing liquid.

As mentioned already before, for cleaning the filter elements (as described in the Background of the Invention, the plate-shaped filter elements are sedimentation plates on which the sediment deposits) it is recommended, in order to facilitate removal of the sediment from the filter elements (sedimentation plates), to position the filter elements vertically during the process of blowing compressed air by means of blowpipes arranged underneath the filter body. For this purpose, preferably a pneumatic drive or pivoting device is used which pivots the individual filter elements from the slanted working position into the vertical position. The filter elements are comprised, for example, of steel plates which are seated in a sawtooth-shaped receptacle and can be pivoted by means of the aforementioned drive device engaging the upper end of the filter elements.

The receptacle for the filter elements is preferably arranged approximately centrally on opposite sides of the filter body. In this way, the filter elements when positioned vertically are pivoted about a central pivot so that the required adjusting forces are minimized.

In order not to have to connect the individual filter elements with the drive device for the pivoting action, it is possible to arrange before, behind, and between the filter elements driving plates which rests against the filter elements or their spacer elements and are pivotably connected with their upper ends to the pivoting device. The filter elements are simultaneously tilted by means of a synchronous pivoting of the driving plates about the pivot.

In order to accelerate the cleaning process carried out by means of the compressed air to be blown in, according to another embodiment of the invention it is provided that several blowpipes are arranged underneath the filter body and that the blowpipes are controlled by individual valves. The blow pressure is approximately three to six bar.

In order to prevent plugging of the blowpipes or to be able to remove sediment that has entered via the outflow openings, the blowpipes are preferably loadable at both ends with compressed air. In this way, the cleaning effect on the filter elements is improved also.

In order to be able to effectively remove the sediment deposited on the filter elements, an unbalance-type shaker can be provided additionally which engages the filter elements or the driving plates.

The removal device for removing the deposited sediment from the bottom of the settling chamber is preferably configured as a so-called scraper belt. This scraper belt is comprised of severable removal strips arranged parallel to one another and supported on two chain guides. The removal strips are pulled across the bottom of the settling chamber.

In order to minimize hooking or wear of the removal strips or of the container bottom, spacer guides can be provided that extend transversely relative to the removal strips. Between them a permanent sediment layer is deposited which also minimizes wear.

The scraper belt is preferably guided and deflected by means of cylindrical rolls in the settling container. The rolls have grooves engaged by the drive chains in a positive-locking way. The drive of the chains is realized to be synchronous by means of corresponding pinions wherein the deflection of the scraper belt from its horizontal run in the container bottom into the removal direction extending upwardly at a slant is realized by means of two rolls or pinions which are arranged relative to one another with vertical displacement. In this way, the deflection angle is increased which provides a significant advantage with regard to calm running of the chain and, over all, reduces the wear of the scraper belt.

In order to be able to safely remove the sediment which is entrained by the slantedly upwardly running removal strips, at the upper deflection point of the scraper belt special stripper devices are preferably provided which, for example, are comprised of pendulously suspended stripper elements which automatically place themselves onto the removal strips and move relative to the removal strips upon further running of the chain so that the sediment deposited or conveyed here is stripped off and drops into a collecting container arranged underneath the scraper belt.

For removing top-floating foreign liquids from a surface of a processing liquid contained in the sedimentation container, for example, a suction pump, a skimmer, or an oil removal belt with rib-shaped stripper elements positioned at a spacing to one another can be provided. In order to ensure removal of the foreign oil that has floated to the top as completely as possible, on opposed sides of the oil removal belt strip-shaped floating oil barriers can be provided which ascend in the direction toward the overflow weir for the foreign oil. In this way, a lateral flow of the oil is prevented and an almost complete removal is achieved.

In order to ensure a continuous skimming or sucking off of the foreign oil, it is also expedient to adjust the liquid level in the sedimentation container to a constant value. For this purpose, for example, ultrasound sensors are provided which detect the respective liquid level in a contactless way and which adjust by means of controllable governing devices, such as overflow flaps, pumps, or the like, the preset value. For a corresponding height of the overflow toward the clean liquid tank closely underneath the adjusted liquid level, it is also ensured by means of the liquid level control that practically no foreign oil will flow into the clean liquid tank.

It should be noted that the filtration device, for maintaining the physical/chemical parameters, in particular, the operating temperature of the processing liquid, can be provided with additional devices such as cooling devices, heaters, metering pumps and the like, which are optionally arranged in an additional tank.

Moreover, it was found to be expedient to configure the spacer elements for the filter elements as parallel extending spacer strips so that a preferred sedimentation in the longitudinal direction of the filter elements is prevented.

By means of an additional tank arranged between the sedimentation container and the clean liquid tank, the cleaning of the filter body can be simplified. The additional tank is provided with a slanted bottom, for example, with a V-shape, and with one or several pumps which remove by pumping at the deepest location the collected sludge and convey it, for example, to the intake area of the sedimentation container. The additional tank can have vertically arranged flow conducting plates which divide it into several chambers. They serve for receiving processing liquid from the sedimentation container when its liquid level is to be lowered for cleaning the filtration elements.

DETAILED DESCRIPTION

Figure 1:
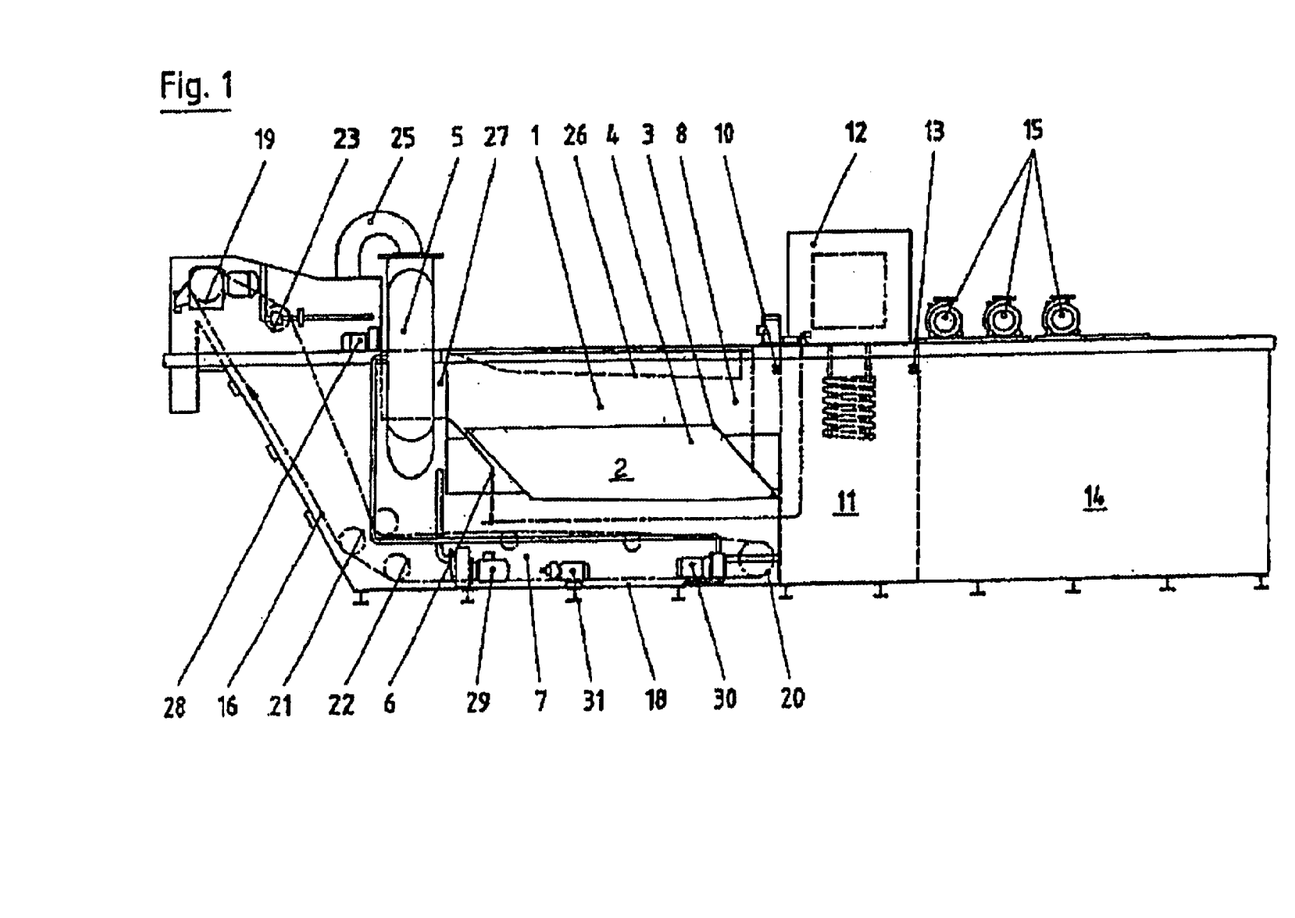
FIG. 1 is a schematic longitudinal section of the sedimentation filtration device according to the invention.

The sedimentation filtration device schematically illustrated in FIG. 1 is comprised substantially of a sedimentation container 1 with a filter body 2 which is comprised of several parallel extending filter elements 3 spaced apart from one another. The spacing of the individual filter elements 3 relative to one another is determined by means of parallel extending spacer strips 4 which are welded onto the filter elements 3 (see FIG. 9).

By means of a supply line 5 opening at opposed sides into the sedimentation container 1 before or adjacent to the filter body 2 (compare FIGS. 2 and 3), the processing liquid to be cleaned is introduced into the sedimentation container 1. The filter body 2 is separated by means of an angled separation plate 6, welded onto the lateral walls of the sedimentation container 1, from the incoming processing liquid such that the processing liquid flows first into the settling chamber 7 which is formed underneath the filter body 2. From here, the contaminated processing liquid rises through the filter body 2 to the top and runs via lateral flow channels 8, 9 (compare FIG. 5) across the weir 10 first into an intermediate cooling tank 11 with a cooling device 12 and from there across the weir 13 into the clean liquid tank 14 from where it is returned by means of the supply pumps 15 into the processing circuit.

In the settling chamber 7 underneath the filter body 2 a scraper belt 16 is provided whose removal strips 17 (compare FIG. 6) are pulled across the bottom 18 of the sedimentation container 1 in the longitudinal direction of the filtration device and entrain the deposited sediment and move it out of the sedimentation container 1 in the upward direction. The scraper belt 16 is driven and deflected at its ends by pinions 19, 20 and guided about profile rolls 21, 22 which are arranged relative to one another with vertical displacement so that the deflection angle between the horizontal run area and the slantedly upwardly extending conveying area becomes more flat. The roll 23 serves as a tensioning element.

In the area of the pinion 19, a stripper devices 24 is provided with which the removed sediment is automatically stripped from the removal strips 17 of the scraper belt 16; it will be explained in the following in more detail in connection with FIG. 7.

The supply lines 5 have sufficiently sized venting pipes 25 through which entrained air bubbles, which could cause foam formation within the sedimentation container 1 and a disruption of the sedimentation process, are removed effectively.

Figure 5:
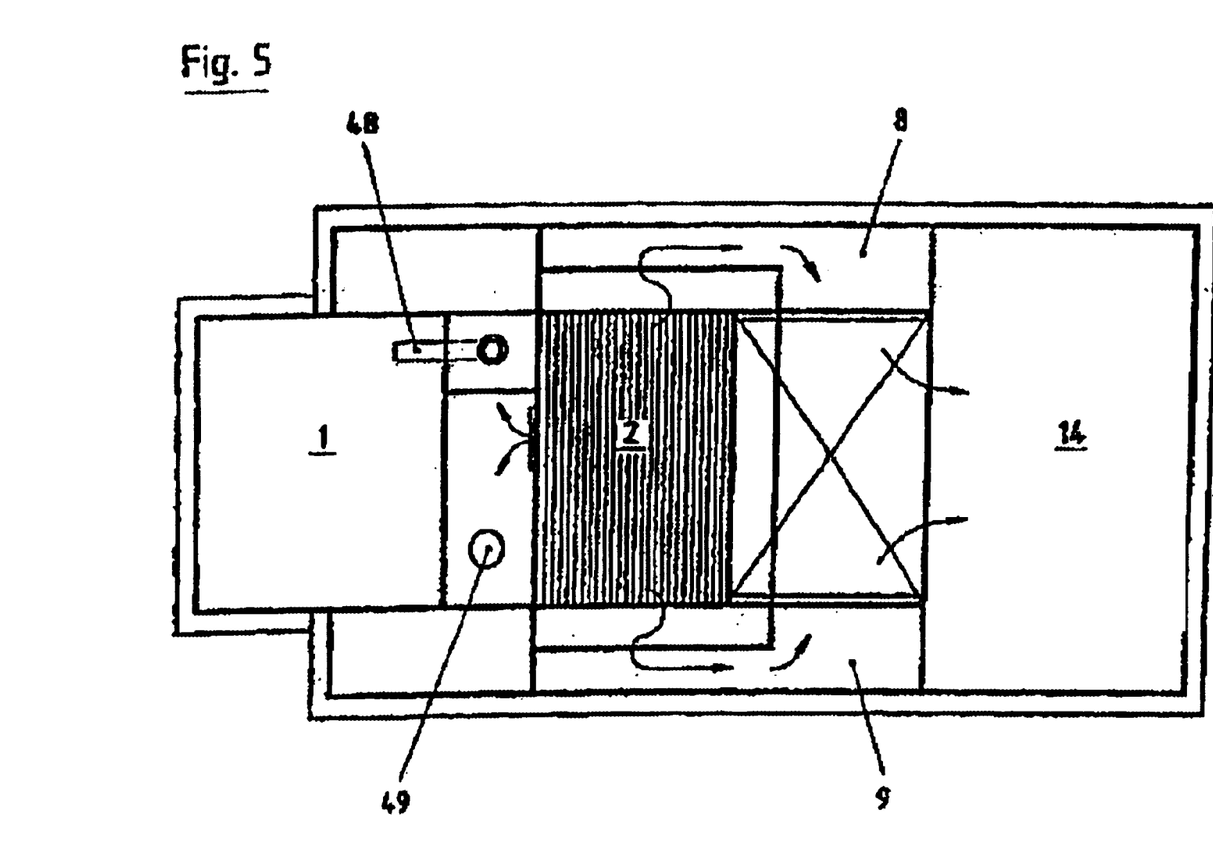
FIG. 5 is a schematic plan view onto the sedimentation filtration device.

In the upper area of the sedimentation container 1 two lateral floating oil barriers 26 are provided through which the foreign oil floating to the top is forced into an oil chamber 27 (compare FIG. 5).

The foreign oil which is collected in the oil chamber 27 can be removed to by means of the oil suction pump 28.

Underneath the foreign oil, a dirt pump 29 conveys the processing liquid and sediment back into the sedimentation container 1. An additional pump 30 serves as a circulation pump and ensures a continuous circulation of the liquid in the sedimentation container 1 in the case of standstill of the device.

By means of a metering pump 31 in the settling chamber 7, it is possible, for example, to add oil in the case of cleaning being performed on emulsions having a preset oil/water ratio that must be maintained.

Figure 2:
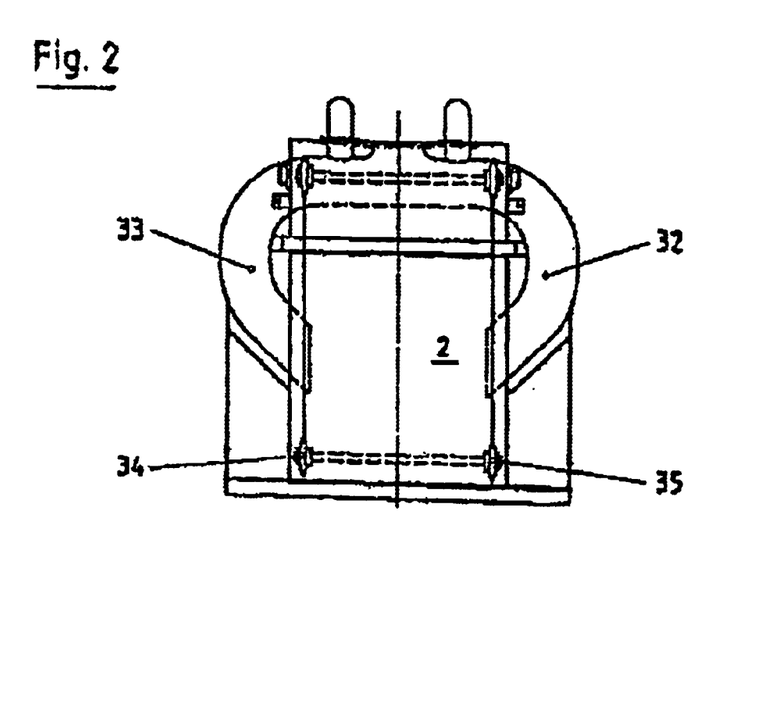
FIG. 2 is a cross-section of the filtration device according to FIG. 1 in the area of the sedimentation container in a first embodiment.

In the sectional illustration of FIG. 2, it is illustrated that the supply line 5 opens at opposed sides into the sedimentation container 1 before or adjacent to the filter body 2, wherein the supply pipes 32, 33 open at a slant into the sedimentation container 1 and have a comparatively large cross-section.

The settling chamber 7 arranged underneath the filter body 2 has a height which is greater than one fifth of the vertical filter height; the scraper belt 16 guided on the chains 34, 35 is running in this chamber 7.

Figure 3:
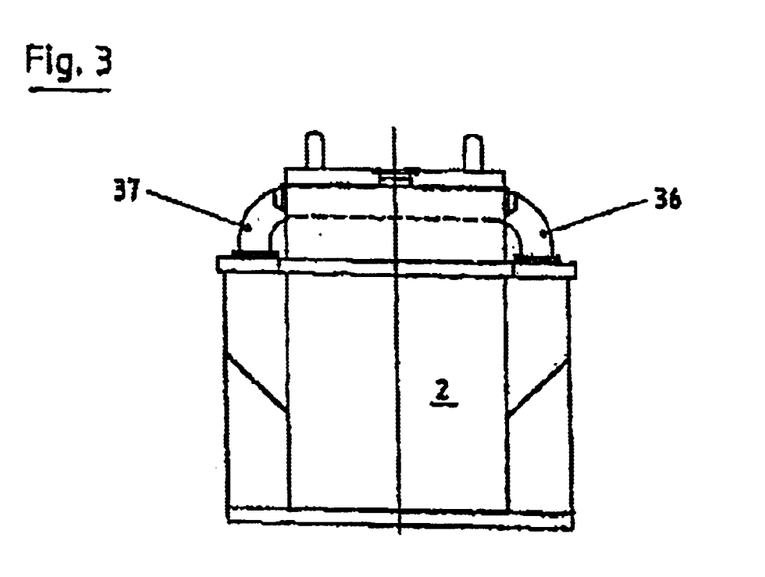
FIG. 3 shows a cross-section of the filtration device according to FIG. 1 in the area of the sedimentation container in a second embodiment.

In the embodiment illustrated in FIG. 3, the supply pipes 36, 37 are widened to a box shape so that the intake cross-section for the processing liquid into the sedimentation container 1 is again enlarged in comparison to the embodiment of FIG. 2.

Figure 4:
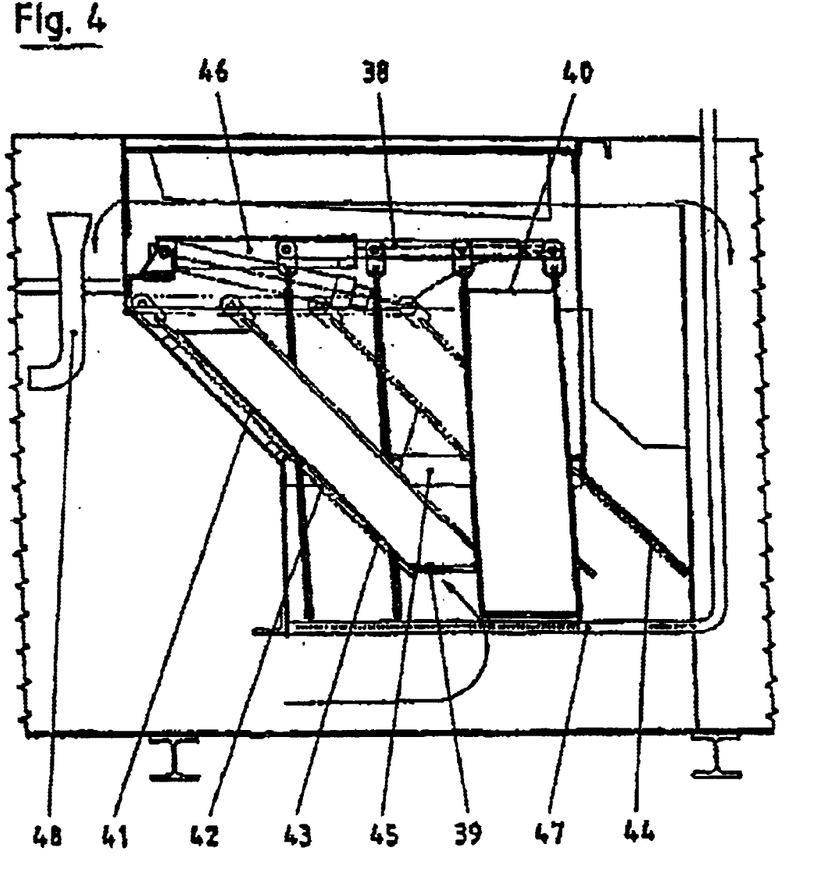
FIG. 4 is a lateral sectional view of the filter body, the driving plates, and the pivoting device.

With reference to the sectional illustration according to FIG. 4, an adjusting linkage 38 will be explained which is used for pivoting the filter elements 3. The filter elements 3 are combined to filter element packages 39, 40 between which driving plates 41, 42, 43, 44 are arranged. The driving plates and the filter element packages are supported in a pivotable way on a central receptacle 45 wherein the driving plates are pivotably connected with their upper ends to the adjusting linkage 38. By extending an adjusting cylinder 46, the individual driving plates can be moved from the slanted working position into a vertical cleaning position; this is illustrated by the filter element package 40.

In this position, by means of the compressed air line 47 compressed air can be blown into the space between the filter elements 3 so that the deposited sediment can be removed and drops downwardly into the settling chamber 7. For supporting the cleaning process, a shaker (not illustrated) can engage the linkage 38.

In the plan view according to FIG. 5, the position of the oil chamber 27 is illustrated. An overflow line 48, which opens underneath the liquid level, returns the processing liquid into the sedimentation container 1 while an oil cup 49 serves for sucking off the removed oil by means of the oil suction pump 28 (compare FIG. 1).

In FIG. 5, the lateral flow channels 8, 9 are also illustrated through which the cleaned processing liquid flows laterally in the direction to the clean liquid tank 14.

Figure 6:
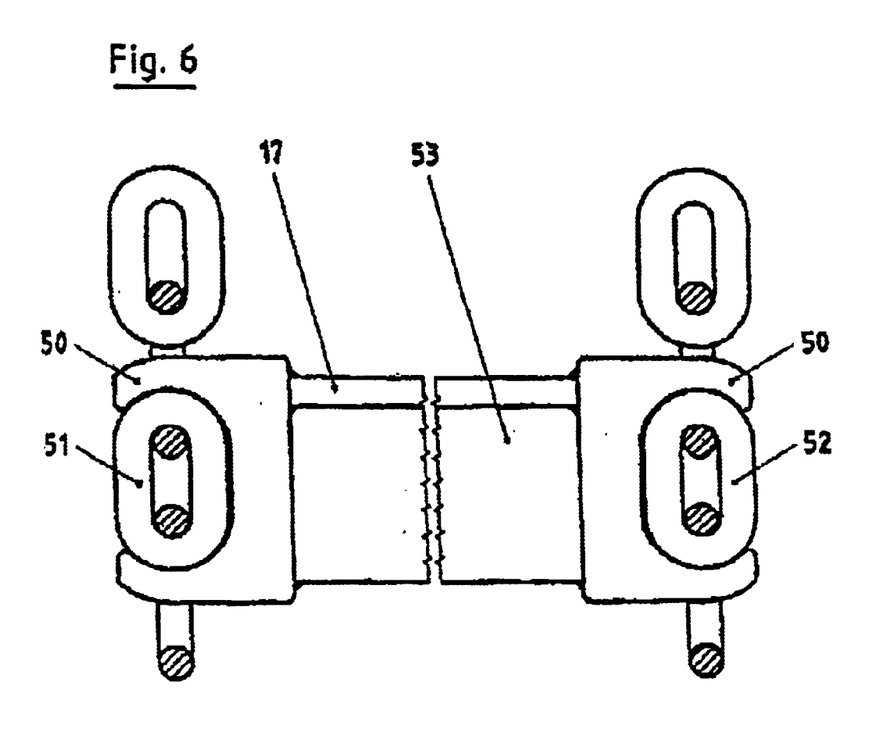
FIG. 6 shows a view of the scraper belt with the chain guides.

In the illustration according to FIG. 6, the individual components of the scraper belt 16 are illustrated. The scraper belt is comprised of T-shaped removal strips 17 which are fastened laterally on driving pawls 50 which are fastened, in turn, on oppositely arranged chain members 51, 52. The scraper belt 16 runs in the longitudinal direction of the filtration device according to FIG. 1 to the left across the profiled rolls 21, 22 wherein the transverse legs 53 of the removal strips 17 move the deposited sediment in front of them and at a slant upwardly to the stripper device 24.

Figure 7:
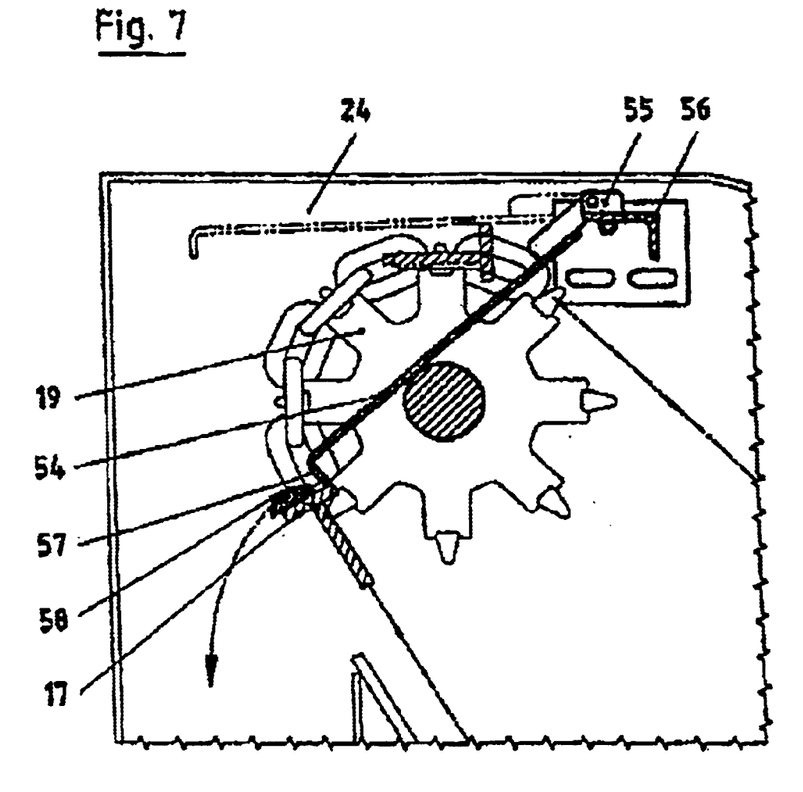
FIG. 7 is a side view of the upper drive pinion for the scraper belt with the pendulous strippers.

Such a stripper device 24 is illustrated in FIG. 7. It is comprised substantially of a plate 54 which is bent at its forward end and arranged between the pinions 19, 20. By means of a hinge 55 it is pivotably supported on a holder 56. In a lower position, the bent end 57 of the plate 54 rests against the surface of the transverse legs 53 and scrapes off the sediment 58 positioned on the leg 53 to the left as a result of the relative movement caused by the continuing movement of the scraper belt 16 so that the sediment 58 drops into a container arranged underneath the stripper device 24.

Upon further movement of the scraper belt 16 the plate 54 then moves into an approximately horizontal upper position from which it drops down again when it is no longer in engagement with the upper transverse leg 53 so that the stripping process can be repeated.

Figure 8:
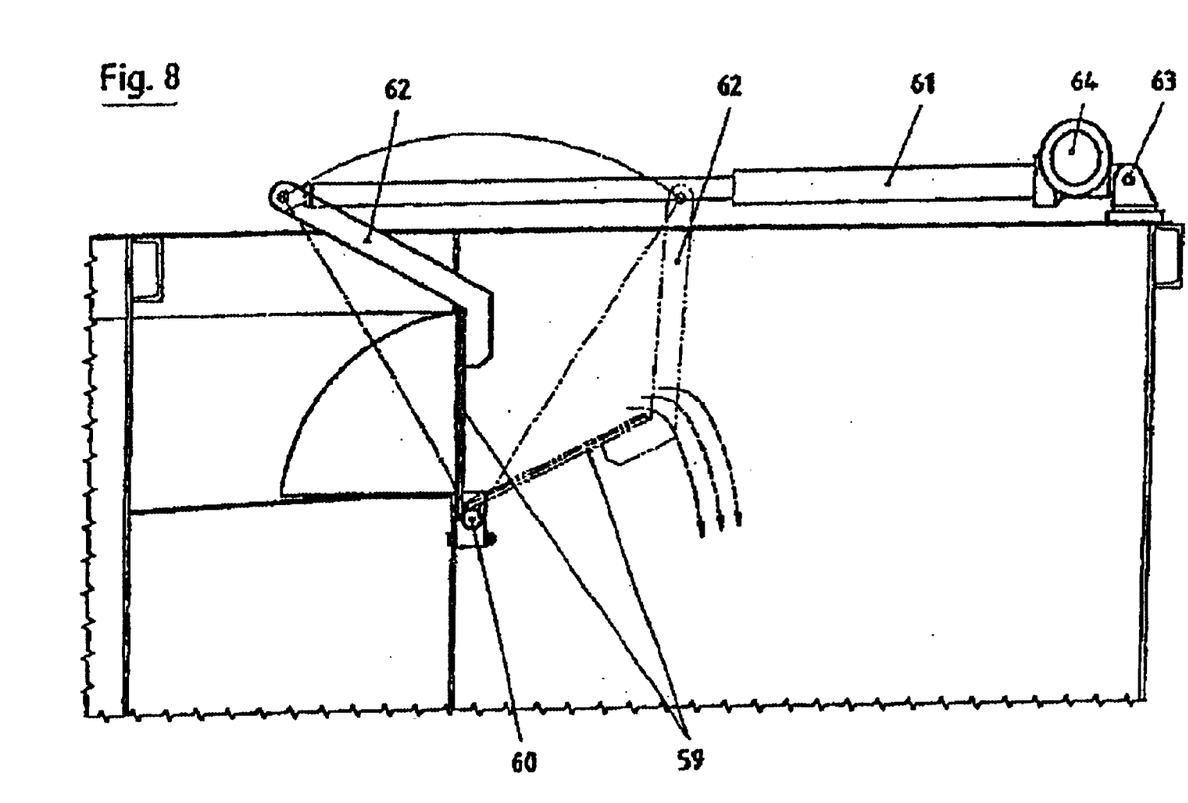
FIG. 8 is a lateral sectional view of the controllable level control flap.

In FIG. 8, an adjustable overflow flap 59 is illustrated with which the liquid level in the sedimentation container 1 can be adjusted. The flap 59 is pivotably supported on a hinge 60 and can be pivoted on a circular path by means of the adjusting cylinder 61 and the angular pawl 62 welded to the flap 59, wherein the angular pawl 62 is connected pivotably to the adjusting cylinder 61. The adjusting cylinder 61 itself is pivotably connected to the hinge 63 and can be adjusted by means of the electric motor 64 so that, depending on the position of the flap 59, the desired liquid level results in the sedimentation container.

Figure 9:
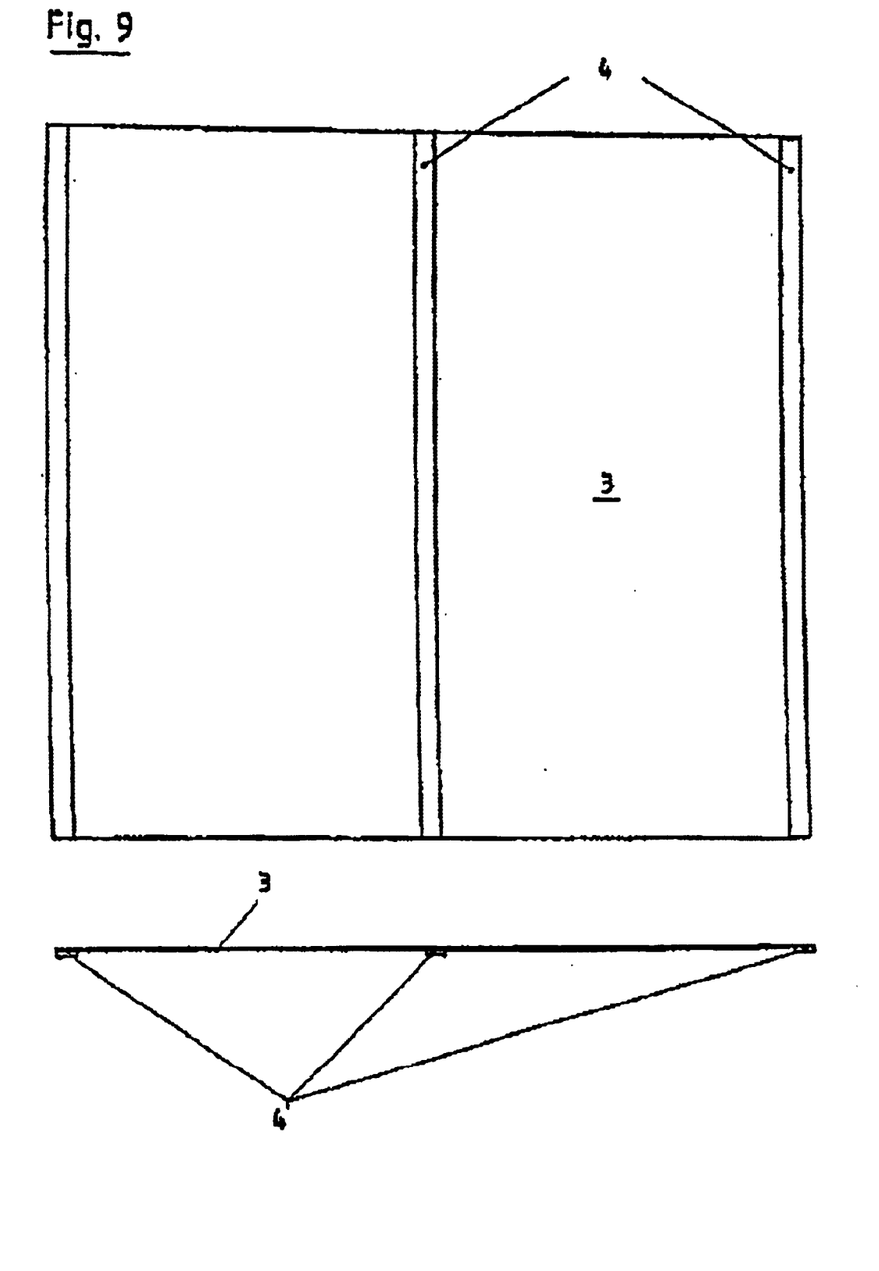
FIG. 9 shows a plan view and a section view of a filter element with parallel extending spacer elements.

The configuration of the individual filter elements 3 with the spacer strips 4 is illustrated in plan view and in section in FIG. 9. In contrast to the bulging portions provided according to the prior art on the filter elements 3 and arranged staggered relative to one another, no preferred sedimentation fan results for the parallel extending spacer strips 4 so that longer operating times of the filtration device are possible between the individual cleaning intervals.

List of Reference Numerals 1) sedimentation container.
2) filter body.
3) filter elements.
4) spacer strips.
5) supply line.
6) separating plate.
7) settling chamber.
8) flow channel.
9) flow channel.
10) weir.
11) cooling tank.
12) cooling device.
13) weir.
14) clean liquid tank
15) supply pumps.
16) scraper belt.
17) removal strip.
18) bottom.
19) pinion.
20) pinion.
21) profile roll.
22) profile roll.
23) tensioning element, roll.
24) stripper device.
25) venting pipe.
26) floating oil barrier.
27) oil chamber.
28) oil suction pump.
29) dirt pump.
30) circulation pump.
31) metering pump.
32) supply pipe.
33) supply pipe.
34) chain.
35) chain.
36) supply pipe.
37) supply pipe.
38) adjusting linkage.
39) filter element package.
40) filter element package.
41) driving plate.
42) driving plate.
43) driving plate.
44) driving plate.
45) receptacle.
46) adjusting cylinder.
47) compressed air line.
48) overflow line.
49) oil cup.
50) driving pawl.
51) chain member.
52) chain member.
53) transverse leg.
54) plate.
55) hinge.
56) holder.
57) bent end.
58) sediment.
59) adjustable flap.
60) hinge.
61) adjusting cylinder.
62) angular pawl.
63) hinge.
64) electric motor.

What is claimed is:

1. A continuously operating sedimentation filtration device for cleaning a contaminated processing liquid, the sedimentation filtration device comprising:

a sedimentation container having an overflow;

several plate-shaped filter elements, having a working position in which the filter elements are arranged at a slant and extend parallel to one another at a spacing to one another, wherein the filter elements form a filter body arranged in the sedimentation container;

a removal device for removing sediment deposited in the sedimentation container;

a clean liquid tank connected to the overflow of the sedimentation container for receiving cleaned processing liquid having passed through the filter body;

a supply comprising at least two supply ideas for introducing the contaminated processing liquid into the sedimentation container, wherein the at least two supply pipes are connected to the sedimentation container on opposed sides of the sedimentation container adjacent to or before the filter elements;

wherein between a bottom side of the filter body and a bottom of the sedimentation container a settling chamber is formed, wherein the settling chamber is filled with processing liquid;

wherein the settling chamber has a vertical height of at least 1/5 of a vertical height of the filter body;

a separating plate provided between the filter body and the at least two supply pipes and configured to separate the processing liquid supplied via the at least two supply pipes from the filter body and to guide the processing liquid into the settling chamber, so that the processing liquid flows from the settling chamber through the filter body in a direction from the bottom to the top;

wherein the removal device for the deposited sediment is a scraper belt arranged on the bottom of the sedimentation container and guided from a horizontal running direction across the bottom of the sedimentation container into a slantedly upwardly extending removal direction across at least two rolls or pinions arranged in the sedimentation container in a vertically staggered position relative to one another.

2. The sedimentation filtration device according to claim 1, wherein the supply comprises venting lines.

3. The sedimentation filtration device according to claim 1, wherein the at least two supply pipes for introducing the processing liquid into the sedimentation container have a widened box shape.

4. The sedimentation filtration device according to claim 1, wherein the filter elements are pivotable from the working position into a cleaning position in which the filter elements extend approximately vertically.

5. The sedimentation filtration device according to claim 4, comprising a pneumatic drive device for pivoting the filter elements.

6. The sedimentation filtration device according to claim 1, further comprising blowpipes arranged underneath the filter body in the sedimentation container and a compressed air line connected to the blowpipes, wherein, for cleaning the filter elements or the filter body, the compressed air line supplies compressed air to the blowpipes.

7. The sedimentation filtration device according to claim 6, wherein compressed air valves are provided for individually controlling flow of compressed air to the blowpipes.

8. The sedimentation filtration device according to claim 6, wherein the blowpipes have compressed air connectors on both ends of the blowpipes, respectively.

9. The sedimentation filtration device according to claim 1, further comprising an unbalance shaker for cleaning the filter elements or the filter body.

10. The sedimentation filtration device according to claim 1, wherein the scraper belt is comprised of chains and removal strips guided on the chains, wherein the removal strips are arranged parallel to one another at a spacing to one another and run across the bottom of the sedimentation container.

11. The sedimentation filtration device according to claim 10, wherein in a bottom area of the sedimentation container at least two spacer guides are provided extending transversely to a movement direction of the removal strips, wherein the removal strips have an underside resting on the spacer guides.

12. The sedimentation filtration device according to claim 10, wherein the scraper belt comprises pinions or cylindrical rolls with grooves for driving, deflecting, or tightening the chains, wherein the chains have chain members for engaging the grooves.

13. The sedimentation filtration device according to claim 10, further comprising a stripper device for removing sediment from the removal strips of the scraper belt, wherein the stripper device has a first end mounted by a hinge in a position above the scraper belt, wherein the stripper device has a second end resting against a topside of the removal strips, wherein, when the scraper belt moves, the second end is entrained and rotated about the hinge so that the second end moves across the topside of the removal strips and scrapes off sediment, respectively.

14. The sedimentation filtration device according to claim 1, wherein the filter elements have spacer strips extending parallel to one another.

15. The sedimentation filtration device according to claim 1, further comprising an oil removal belt, positioned in the sedimentation container so as to run above the liquid level for removing foreign oil floating on the processing liquid, wherein the oil removal bolt has rib-shaped strippers positioned at the spacing to one another.

16. The sedimentation filtration device according to claim 1, further comprising an oil suction pump arranged in the sedimentation container for removing foreign oil floating on the processing liquid.

17. The sedimentation filtration device according to claim 1, further comprising a skimmer arranged in the sedimentation container for removing foreign oil floating on the processing liquid.

18. The sedimentation filtration device according to claim 1, further comprising two at least partially slantedly extending stay-shaped floating oil barriers arranged laterally in the sedimentation container above the filter body for forcing foreign oil floating to the top of the processing liquid into an oil chamber.

19. The sedimentation filtration device according to claim 1, comprising a level control configured to control a liquid level of the processing liquid in the sedimentation container.

20. The sedimentation filtration device according to claim 19, wherein the level control comprises ultrasound sensors for detecting the liquid level of the processing liquid and controllable governing devices for adjusting the liquid level.

21. The sedimentation filtration device according to claim 20, wherein the controllable governing devices are overflow flaps.

\* \* \* \* \*